Aug. 14, 1962  W. A. DU PLOOY  3,049,700
VIBRATION RESPONSIVE BURGLAR ALARM APPARATUS
Filed June 8, 1960

INVENTOR
Wilhelm Andrew Du Plooy
By
Watson, Cole, Grindle & Watson
ATTORNEYS

United States Patent Office 3,049,700
Patented Aug. 14, 1962

3,049,700
VIBRATION RESPONSIVE BURGLAR ALARM
APPARATUS
Wilhelm A. Du Plooy, Pietersburg, Transvaal, Union of South Africa, assignor of one-half to Max Chaitow, Pietersburg, Transvaal, Union of South Africa
Filed June 8, 1960, Ser. No. 34,738
Claims priority, application Union of South Africa
June 15, 1959
4 Claims. (Cl. 340—261)

This invention relates to alarm apparatus for indicating movement of a body on which it is mounted and is particularly suitable for use as a burglar alarm for a motor vehicle though not confined to this use.

The alarm apparatus according to this invention comprises a torsion bar having a cantilever member projecting therefrom, and one of a pair of spaced alarm circuit contacts secured to said member and movable therewith.

According to a further feature of the invention means are provided for variably loading the cantilever member to vary the sensitivity of the apparatus.

A preferred form of this invention is illustrated in the accompanying drawings in which.

Figure 1:
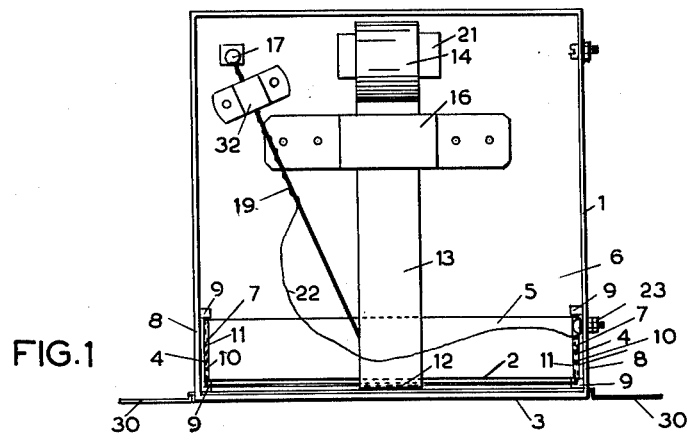
FIG. 1 shows a plan of alarm apparatus with the top removed.

As illustrated in this example the invention is applied to motor vehicle burglar alarms and in this embodiment there is provided a box 1 of electrically insulating material having mounted therein a torsion bar 2 positioned parallel to and adjacent one side 3 of the box 1. The torsion bar 2 is anchored at each end 4, 4. The anchors may conveniently be formed by a strip of flat metal 5 running across the bottom 6 of the box and having upwardly bent ends 7 against opposite side walls 8. These ends are located between inward projections 9 from the side walls 8 and the tips 10 of the bent ends 7 may be crimped over to hold ends 11 of the torsion bar 2 which ends are bent inwardly across the ends 7 of the metal strip 5.

The torsion bar 2 in this example may most conveniently be formed from a length of fine gauge stainless steel wire.

One end 12 of a further strip of metal 13 is secured approximately centrally to the torsion bar 2. The other end 14 of the strip 13 is weighted so that it maintains the torsion bar under torsional stress and projects radially and horizontally from said bar as a cantilever member. The weighting of the end 14 is readily effected by having the end 14 curled around a lead or other weight 15. The weight 15 may be varied to suit particular requirements. A stirrup 16 may be provided over the strip 13 and be secured to the bottom 6 of the box 1 to prevent damage to the torsion bar 2 when the vehicle on which the alarm apparatus is mounted is subjected to severe sudden movement.

With this structure the strip 13 will respond to any movement of the box by a vibratory movement which once initiated will continue for an appreciable period, the weighted strip 13 being very sensitive to any such movement of the box.

This vibratory movement of the strip 13 is utilised to effect the making and breaking of contacts 17, 18 in an electrically powered alarm circuit so that an intermittent alarm signal is given during the period of vibration. For this purpose a light and slightly flexible arm 19 projects from the strip at a small angle thereto and terminates in one contact 17 of a pair of contacts 17, 18 adapted to be connected in the vehicle horn circuit. The arm 19 will preferably also be made from a length of fine gauge stainless steel wire. The other contact 18 of the pair is fixed to the end of an adjustable screw 20 threaded through the underside of the box 1.

To control the sensitivity of the apparatus the strip has a fixed predetermined loading due to weighting above mentioned and the setting of the adjustable screw 20 forming the second contact 18 is adjusted to suit particular requirements. Withdrawal of the screw 20 from the box on the screw thread through the bottom of the box decreases the sensitivity of the device by increasing the distance between the contacts 17, 18. Also pads 21 of sponge rubber plastic or material having similar properties are included in the box 1 to absorb the shocks set up by the vibrations of the strip 13 during operation of the device. These pads are secured to the top and bottom of the box 1 and positioned above the weighted end 14 of strip 13.

Figure 2:
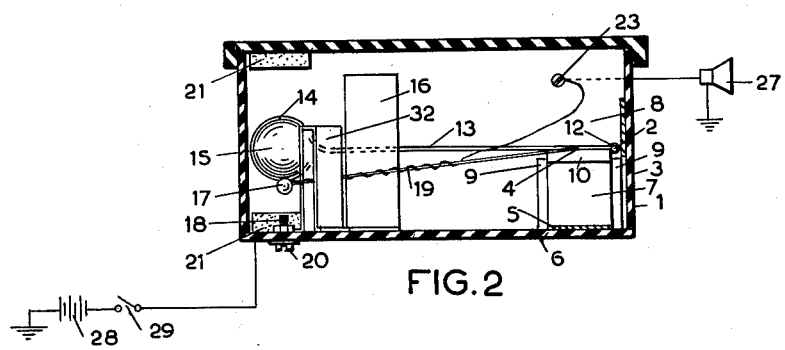
FIG. 2 is a side elevation partly in section.
Figure 3:
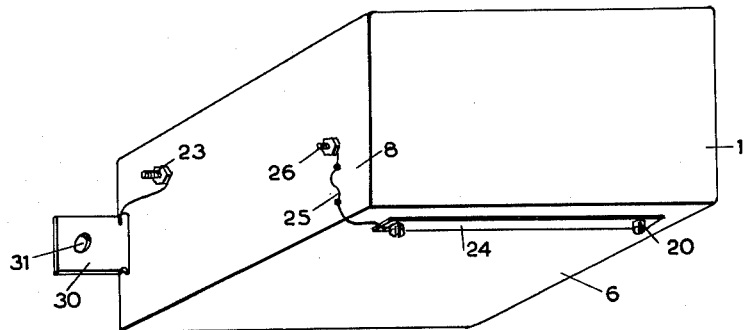
FIG. 3 is a perspective view of the apparatus.

The electrical lead 22 from the movable contact 17 is wound around the arm 19 and taken to the screw threaded stud 23 projecting through the side wall of the box 1. A lead 24 is taken from the adjusting screw 20 preferably through a fuse 25 to a further threaded stud 26 on the same side of the box 1 as stud 23. This facilitates connection of the alarm apparatus into an electrical circuit. This circuit is diagrammatically depicted in FIG. 2 by means of a horn 27, battery 28 and switch 29.

To mount the box on the vehicle a strap 30 is provided having preforations 31 at each end for the passage of suitable mounting screws.

A stirrup 32 may also be provided over the arm 19 for the purposes above described in connection with strip 13. It is found suitable to make the electrical contacts of silver.

In use, the apparatus is attached in a horizontal position to a part of a motor vehicle and the switch 29 provided enables the apparatus to be connected through the horn 27 circuit of the vehicle. When the switch 29 is closed and immediately the vehicle is touched, for instance, if any attempt is made to open a window, a door, or the hood, the movement will set the apparatus in vibration and the make and break mechanism formed by the pair of contacts 17, 18 above described will cause the horn 27 to sound intermittently. The horn 27 will continue to operate as long as the movement continues but if the vehicle is left, the vibrations will cease and the alarm will stop.

The connections to the circuit of the vehicle can be varied to suit the vehicle. Also, if preferred, the circuit can be connected to the lighting circuit to give a visual alarm at night.

In a modification, the apparatus could be connected through the coil and battery to the body of the vehicle so that any burglar would receive a shock on touching the metal body.

The apparatus can also be adapted for attachment to almost any article, for instance to safes, to tables and desks, to cupboards and to windows and doors of houses. In these cases, the terminals can be connected to the lighting circuit to give a visual and/or audible alarm.

What I claim as new and desire to secure by Letters Patent is:

1. Alarm apparatus for connection in an electrical circuit comprising a torsion bar, a cantilever member secured to and projecting radially and in a substantially horizontal direction from said torsion bar such that said cantilever member exerts a force tending to twist said torsion bar about its longitudinal axis, a pair of spaced alarm circuit contacts one of which is connected to said cantilever member and movable therewith, and an enclosure for said apparatus.

2. Alarm apparatus as defined in claim 1 including a predetermined replaceable load connected to the free end of said cantilever member.

3. Alarm apparatus as defined in claim 1 including an arm connected to and projecting from said cantilever member and having said movable contact mounted on the end of said arm.

4. Alarm apparatus as defined in claim 3 including stirrups over said cantilever member and said arm, and pads secured in said enclosure above and below the free end of said cantilever member.

References Cited in the file of this patent

UNITED STATES PATENTS

| | | |
|---|---|---|
| 1,539,979 | Waddington | June 2, 1925 |
| 1,846,966 | Hausse | Feb. 23, 1932 |
| 2,101,429 | Felice | Dec. 7, 1937 |
| 2,402,111 | Engler | June 11, 1946 |
| 2,509,667 | Ballinger | May 30, 1950 |
| 2,885,504 | Yurtz | May 5, 1959 |

FOREIGN PATENTS

| | | |
|---|---|---|
| 366,439 | Germany | Jan. 5, 1923 |
| 51,750 | Norway | Nov. 7, 1932 |